US009514208B2

(12) United States Patent
Srinivasan et al.

(10) Patent No.: US 9,514,208 B2
(45) Date of Patent: Dec. 6, 2016

(54) METHOD AND SYSTEM OF STATELESS DATA REPLICATION IN A DISTRIBUTED DATABASE SYSTEM

(71) Applicants: Vekatachary Srinivasan, Sunnyvale, CA (US); Sunil Sayyaparaju, Vedureswaram (IN); Rajkumar Iyer, Bangalore (IN)

(72) Inventors: Vekatachary Srinivasan, Sunnyvale, CA (US); Sunil Sayyaparaju, Vedureswaram (IN); Rajkumar Iyer, Bangalore (IN)

( * ) Notice: Subject to any disclaimer, the term of this patent is extended or adjusted under 35 U.S.C. 154(b) by 258 days.

(21) Appl. No.: 14/024,181

(22) Filed: Sep. 11, 2013

(65) Prior Publication Data
US 2015/0074052 A1 Mar. 12, 2015

(51) Int. Cl.
*G06F 17/30* (2006.01)
(52) U.S. Cl.
CPC ................................ *G06F 17/30575* (2013.01)
(58) Field of Classification Search
CPC .................................................. G06F 17/30575
See application file for complete search history.

(56) References Cited

U.S. PATENT DOCUMENTS

| 8,656,454 | B2* | 2/2014 | Gunawardena et al. | 726/1 |
| 2006/0047713 | A1* | 3/2006 | Gornshtein et al. | 707/202 |
| 2011/0251997 | A1* | 10/2011 | Wang et al. | 707/634 |
| 2013/0124466 | A1* | 5/2013 | Naidu et al. | 707/610 |
| 2013/0290249 | A1* | 10/2013 | Merriman et al. | 707/610 |

* cited by examiner

*Primary Examiner* — Mohammad S Rostami

(57) ABSTRACT

In one exemplary embodiment, a method includes the step of executing, with at least one processor, a main database node server in a source-database node of a source-database cluster. The main database node server manages database server operations. The main database node server communicates a source-database cluster state and a specified server operation metadata to a data-shipping daemon. The specified server operation metadata, includes an information about server operation occurring on the source-database node. Another step includes executing a data-shipping daemon in the source-database node. The data-shipping daemon receives the specified server operation metadata and stores the specified server operation metadata in a digest log. The data log includes a file of the specified server operation metadata. The data-shipping daemon reads the digest log and communicate data referred to in the specified server operation metadata in the digest log to a destination database node in a destination database cluster.

10 Claims, 8 Drawing Sheets

METHOD AND SYSTEM OF STATELESS DATA REPLICATION IN A DISTRIBUTED DATABASE SYSTEM

CROSS-REFERENCE TO RELATED APPLICATIONS

This application claims the benefit of U.S. Provisional Application No. 61/720,383, filed Oct. 30, 2012 and titled 'METHOD AND SYSTEM OF STATELESS DATA MIGRATION'. This application claims the benefit of U.S. Provisional Application No. 61/759,278, filed Jan. 31, 2013 and titled 'METHOD AND SYSTEM OF STATELESS DMA MIGRATION'. These provisional applications are incorporated herein by reference.

BACKGROUND

1. Field

This application relates generally to data storage, and more specifically to a system, article of manufacture and method for implementing a stateless data replication in distributed database system.

2. Related Art

A distributed database system can include a plurality of database clusters. Various data backup methodologies can be employed to ensure persistent access by client device. Accordingly, data stored in one database cluster can be written to another database cluster. For example, a snapshot of the cluster can be stored in a remote cluster. Additionally, write/update operations in one cluster can be passed to the backup cluster on a periodic basis. Provide for greater geographical locality of relevant database clusters can be another motivation for concurrently maintaining data availability in two or more database dusters. Closer locations between client and database clusters can decrease response time. Database clusters can include multiple database nodes. A database node can fail unexpected. Additionally, the number of database nodes in a particular database cluster can fluctuate (e.g. increase, decrease, etc.). Thus, the states of various elements of a distributed database can dynamically change and affect the performance of the distributed database system.

BRIEF SUMMARY OF THE INVENTION

In one aspect, a computerized distributed database system includes a a main database node server that executes, with at least one processor, in a source-database node of a source-database cluster. The main database node server manages database server operations. The main database node server communicates a source-database cluster state and a specified server operation metadata to a data-shipping daemon. The specified server operation metadata includes information about server operation occurring on the source-database node. A data-shipping daemon executes in the source-database node.

The data-shipping daemon includes a digest logger receiving the specified server operation metadata and storing the specified server operation metadata in a digest log. The data log includes a the of the specified server operation metadata. A data shipper module reading the digest log and communicating data referred to in the specified server operation metadata in the digest log to a destination database node in a destination database cluster.

The data-shipping daemon can include a failure-handling module that resumes an operation of the data-shipping daemon at a substantially current point of the digest log in the event of a recovery of the source-database node from a failed state, and can take responsibility of shipping of data for other source-database cluster nodes which are not currently present in the source-database cluster.

In another aspect, a method includes the step of executing, with at least one processor, a main database node server in a source-database node of a source-database cluster. The main database node server manages database server operations. The main database node server communicates a source-database cluster state and a specified server operation metadata to a data-shipping daemon. The specified server operation metadata includes an information about server operation occurring on the source-database node. Another step includes executing a data shipping daemon in the source-database node. The data-shipping daemon receives the specified server operation metadata and stores the specified server operation metadata in a digest log. The data log includes a file of the specified server operation metadata. The data-shipping daemon reads the digest log and communicate data referred to in the specified server operation metadata in the digest log to a destination database node in a destination database cluster. The data-shipping daemon generates an event queue. The event queue includes a list of asynchronous database trigger functions. Data-shipping daemon calls an asynchronous database trigger function based on an order of the event queue. The data-shipping daemon can resume operating at a substantially current point of the digest log in the event of a recovery of the source-database node from a failed state.

BRIEF DESCRIPTION OF THE DRAWINGS

The present application can be best understood by reference to the following description taken in conjunction with the accompanying figures, in which like parts may be referred to by like numerals.

Figure 1:
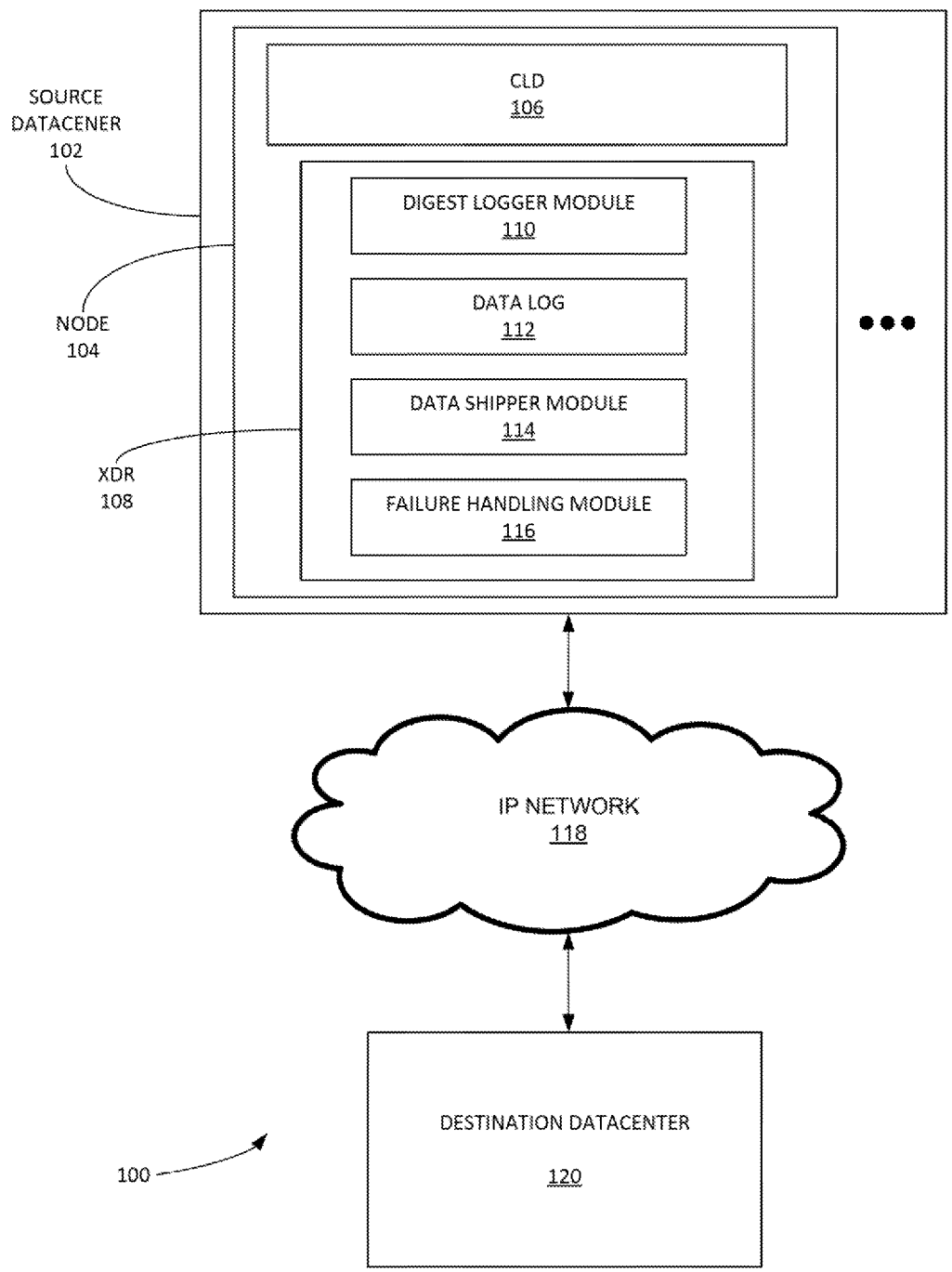
FIG. 1 depicts, in block diagram format, a system to support movement of data from a source datacenter to a destination datacenter, according to some embodiments.

The Figures described above are a representative set, and are not an exhaustive with respect to embodying the invention.

DETAILED DESCRIPTION

Disclosed are a system, method, and article of manufacture for implementing stateless data replication in a distributed database stem The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Environment and Architecture

FIG. 1 depicts, in block diagram format, a system 100 to support movement of data from a source datacenter 102 to a destination datacenter 120. In one example, the source datacenter 102 and the destination datacenter 120 can be separated over long geographical distances. However, in another example use case, a datacenter can be local to the location of instances of a running application. As multiple instances may be geographically separated, the associated datacenter may not be on the same intranet (LAN). The datacenters may be connected over a wide area network (WAN). Thus, system 100 can be configured to support the movement of data among these datacenters as well.

The source datacenter 102 can include a source cluster which includes a set of nodes (e.g. node 104) on one or more running server processes. Taking node 104 as an example of a member database node of the source cluster 102, node 104 can include a CLD process 106 and/or an XDR process 108 (e.g. a data-shipping daemon). CLD process 106 can be a main database server process (e.g. running as a server process in node 104). It is noted that source cluster 102 can include other member database nodes (not shown).

XDR process 108 can be a separate process running in node 104. It is noted that a separate XDR process can correspond to each database server process in all nodes of the source cluster. Certain server operations (e.g. writes/updates) that occur on node 104 can be communicated to XDR process 108 over a named pipe (e.g. a temporary section of computer memory capable of linking two or more computer processors). This communication can be received in XDR process 108 by digest logger module 110. Digest logger module 110 can manage the storing of the received information in a log file such as digest log 112. In an example embodiment, certain minimal information (e.g. the key digest) may be stored in digest log 112 in order to maintain the file size below a threshold. For example, digest log 112 can include information used to ship (e.g. asynchronously ship) the actual records at a later stage. XDR process on a node can record the information on behalf of other nodes as well so that the information can be used in the event of failure of other nodes. It is noted that in some embodiments, XDR process 108 does not store the record in digest log 112. Digest log 112 can include a file that includes a ring buffer. A ring buffer can include the most recent data and can potentially overwrite the oldest data if certain conditions are met such as when its buffer is full. The file size of digest log 112 can be configured as a size sufficient to avoid loss of any pending data to be shipped. In one example, the file size of digest log 112 can be static.

The XDR process 108 can include data shipper module 114. Data shipper module 114 can manage various operations including, inter alia, reading the digest log and/or shipping (e.g. asynchronously shipping) the relevant data to destination datacenter 120 (e.g. a remote data center). Data shipper module 114 can behave like a client application with respect to destination datacenter 120 (or, in some embodiments, another remote duster). Data shipper module 114 can ship the data to destination datacenter 120 as normal writes. The speed at which the data is shipped to destination datacenter 120 can depend on various factors. Example factors can include the write speed of node 104 and/or the bandwidth of the available in network 118. lithe rate of data that is being written is consistently above the rate at which data shipper module 114 can ship the data destination datacenter 120, data shipper module 114 may not be able to synchronize all the data to the data destination datacenter 120. The pending data may continue to accumulate and may ultimately get dropped. Thus, the available bandwidth can be set to be sufficient to catch up the pending-to-be-shipped data during the low periods of workload for system 100. Failure handling module 116 can manage various operation including, inter alia, monitoring and/or performing the required activity to ensure XDR process 108 continues to ship data in case of failure. The failure can be the failure of a neighboring node or the failure of the link to the destination datacenter 120.

XDR process 108 can share the same configuration file with the server and/or support various configuration options of its own. XDR process 108 can support various modes such as active-active and/or active-passive. In some embodiments, system 100 can be in an active-passive mode, write operations may be implemented on one cluster such as a source cluster (e.g. source datacenter 102) and not on another cluster such a destination cluster (e.g. destination datacenter 120). For example, the destination cluster may be a stand-by cluster used for read operations.

Figure 6:
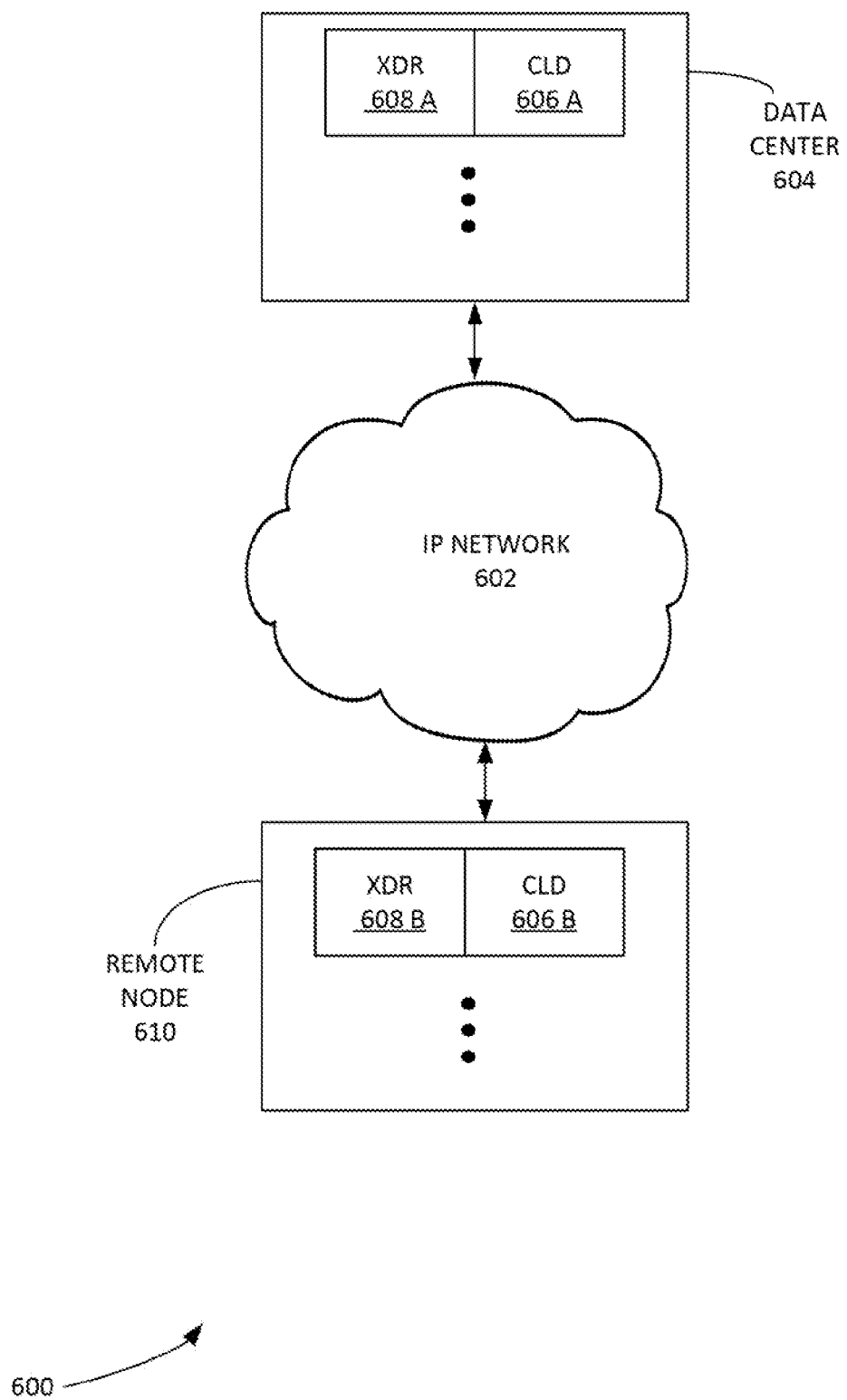
FIG. 6 illustrates an example system including two datacenters operating in an active-active mode, according to some embodiments.

In some embodiments, system 100 can be in an active-active mode, the write operations can be performed at both the source 'A' and destination cluster(s) 'B', as well as, an XDR configured on both the clusters such that writes on source A can be shipped to cluster(s) B and vice versa (see FIG. 6 infra). For example, a write operation performed on one cluster can also be implemented on the other cluster. XDR process 108 can ensure that the data shipped is not forwarded further thereby forming an infinite loop.

An example policy of active-active mode conflict write resolution that can be implemented by system 100 is now described. In the event that the system includes two different versions of a certain digest or key, write resolution can be implemented using several methods based on an applicable configuration option. In one method, the resolution can be based on the generation (e.g. as provided by a monotonically increasing number associated with the record, which is incremented every time the record is updated) and the higher generation is selected. This resolution policy can be used to pick up the record with a higher generation and hence is the latest copy of data. If the generations are equal then another factor can be chosen to select the version to be written. For example, a version with a later creation time stamp (e.g. as determined by a clock information time stamped on records which indicates the time the record was created and/or last updated) wins. in the case that the time stamp values are also equal, then the existing data may not be overwritten (e.g. incoming write can be rejected). This policy can be used to select a latest record. In this example conflict resolution policy, the source and destination cluster's clock can be synchronized.

It is noted that some embodiments, various topologies can be implemented other than the paired topology shown in FIG. 1. For example, a plurality of clusters can be arranged in a ring topology as represented with A->B->C->D->A. In this example, the XDR process of a cluster node can include a node address of the next cluster of the chain. The cluster nodes can also be configured so that write operations as a result of XDR shipping can be logged in the digest log of the target cluster. In this way, each cluster node can ship write operations (e.g. XDR-related write operations) to the next cluster in the chain. This forwarding process can continue until the data reaches back to the source node that originally wrote the data at which point the forwarding process can be set to stop. For example, the write can maintain information that identifies the originating cluster identifier and/or visited clusters. When the write goes through the complete ring and reaches the originating cluster and/or already visited cluster the write is terminated. In case of conflict, all the concurrent writes can be shipped to the subsequent cluster, the originating cluster with highest site precedence can then eventually write the data to the other nodes. In this way, the data in all the member clusters can be synchronized.

It is noted that in some embodiments, the definitions of multiple datacenters can be specified in XDR process 108. Furthermore, the name of the data-center to which a namespace can be shipped to, can be specified in a namespace section as well. Using these two conditions in conjunction, a different target data-center can be specified for each namespace. This may be done in various example cases such as when data of different namespaces is to be shipped to different destination clusters. In another example, if a namespace is configured to go to multiple destinations and/or if a link to one of the remote datacenters is down, replication to the datacenters with a working link can continue uninterrupted. The replication to the datacenter with a failed link may stall. When the stalled link is restored, the XDR can detect and resume replication from the point where the stall occurred.

In some embodiments, an XDR process (e.g. XDR process 108) can be started on all the nodes where a corresponding node server (e.g. CLD 106) is being executed. Additionally, it can be determined that a corresponding node server has joined the cluster before starting an XDR process. Several start and failover operations can be defined with respect to an XDR process. For example, a 'noresume' operation can start an XDR process anew. It is noted that once an XDR process is started with 'noresume' operation, the old log records in the digest log may be deleted. A 'noresume' operation can also be used to restart a single node in the event of a single node failure. For example, when a single node fails, the responsibility of shipping its data can be assumed by an XDR process on a different node in the cluster. Accordingly, the XDR process on the failed node, when it restarts, need not resume from the point at which it left. It can resume at a point to ship only the freshly written data.

In another example, a 'resume' operation can start an XDR process and can resume shipping of an associated log from start of the log. Along with shipping data of current node, it also takes responsibility of shipping of data for the nodes which are not currently present in the cluster. The XDR process can ship data of another node when the digest log on this node has the shadow logs. Thus, the 'resume' operation can be used when multiple nodes have failed and some portion thereof could not be brought back online.

A 'resume-nofailover' operation can start an XDR process with resumption of shipping of a log from the point the last failure occurred. However, an XDR process may not take the responsibility of shipping on behalf of the other nodes that may not be available. The 'resume-nofailover' operation can be used when a certain node(s) fails and is brought up again and it is known that the shipping for the replica need not be performed. If all the nodes are restarted, then each node can manage its own respective logs. In this way, all the logs can be covered. A 'resume-nofailover' operation can be useful when doing a rolling upgrade and/or planned shutdown of an entire cluster when it is sure that all the nodes that are taken down can then be brought up again.

XDR process 108 can write the corresponding log records in the digest log (e.g. a shadow log) at the replica node (e.g. a cluster node at which a redundant copy of the record is stored) also along with the data. However, XDR 108 may not ship using the shadow log unless the master node (e.g. a cluster node at which first copy of record is written and stored) fails. Once a node fails, its replica nodes can take over the failed node's responsibility of shipping the failed node's data.

In some embodiments, XDR process 108 can provide monitoring ability to the user through client tools (e.g. a command line interface, dashboard and the like). For example, queries can be provided to fetch all the XDR statistics such as a number of records logged into digest log, a number of relogged records, a number of records processed, a number of records processed for the non-local node, a number of records shipped to a remote datacenter, etc. It is noted that dynamic configuration options can also be looked up and changed using the above mentioned example client tools.

Various XDR parameters can be set to tune the speed of shipping batch-size. For example, XDR process 108 can determine the maximum number of records that can be shipped in parallel at any given point in time. This parameter can be utilized when the latency between the datacenters is high (e.g. above a specified threshold). Increasing, this number can create a larger pipeline of data to be shipped in parallel. A thread's parameter can be modified to control the number of threads that are processing a response from a destination cluster. This can be utilized when the latency between the datacenters is low (e.g. below a specified threshold). In this example, the response from the remote cluster can return at a faster rate than during a high latency period, and thus more threads may be needed to process said response.

Figure 2:
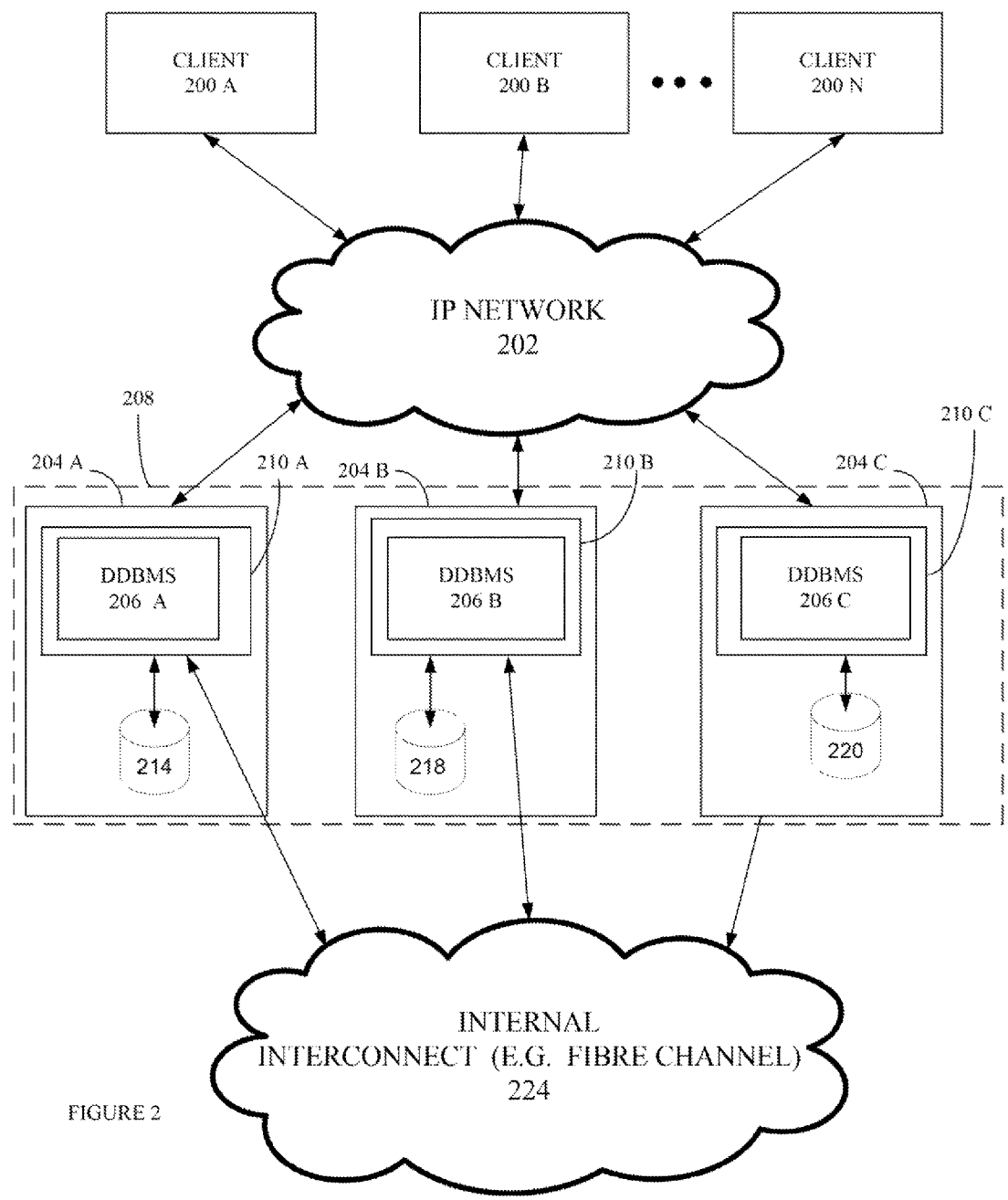
FIG. 2 shows, in a block diagram format, a distributed database system (DDBMS) operating in a computer network according to an example embodiment, according to an example embodiment.

FIG. 2 shows, in a block, diagram format, a distributed database system (DDBMS) operating in a computer network according to an example embodiment. The DDBMS of FIG. 2 can typically be a collection of databases that can be stored at different computer network sites (e.g. a server node). Each database may involve different database management systems and different architectures that distribute the execution of transactions. The DDBMS can be managed in such a way that it appears to the user as a centralized database.

The DDBMS can be a distributed, scalable NoSQL database, according to some embodiments. The DDBMS can include, inter alia, three main layers: a Client layer 200 A-B, distribution layer 210 A-N and/or a data layer 212 A-N. Client layer 200 A-B can include various DDBMS client libraries. Client layer 200 A-B can be implemented as a smart client. For example, Client layer 200 A-B can implement a set of DDBMS application program interfaces (APIs) that are exposed to a transaction request. Client layer 200 A-B can also track cluster configuration and manage the transaction requests, making any change in cluster membership completely transparent to the customer application 204 A-N.

Nodes 204 A-C can communicate to clients 200 A-B via IP network 202. Internet-protocol (IP) network 202 can utilize a set of communications protocols used for the Internet and other similar networks. In some embodiments, IP network 202 may also include other means of data communication such as a local area network (LAN) that utilizes IEEE 802-type protocols, a telecommunications data network, or any combination thereof. Clients 200 A-B can be any application of process that communicates with nodes 204 A-C via IP network 202.

Nodes 204 A-C can include one or more central processing units (CPU), memory resources and permanent data storage systems. Database nodes 204 A-C can include distributed database management system (DDBMS) 206 A-C. DDBMS 206 A-C can include a set of computer programs that controls the creation, maintenance, and the use of distributed database of cluster 208. DDBMS 206 A-C manages the various data storage systems 214, 418 and 420 that comprise the distributed database as well as the data objects on the data storage systems. The particular example embodiment of FIG. 2 shows DDBMS 206 A-C as a distributed database manager layer. The DDBMS 206 A-C can include components that are able to execute database tasks on their respective servers 210 A-C, and to carry out functions (described infra) that relate to the operation of the DDBMS in cluster 208. Each DDBMS can include a CLD (e.g. a database server instance) and a corresponding XDR process. In some examples, these XDR processes can fork a write operation to the DDBMS and record related information such as which keys were added/updated. Later these changes can be shipped asynchronously to the destination datacenter 120 (e.g. can be a remote datacenter). It is noted that the DDBMS 206 A-C can synchronize their clocks such that the nodes of the cluster can be substantially synchronized. In this way, in the event of a node failure, the remaining nodes can correctly takeover the responsibility for shipping the data of the failed node.

Destination datacenter 120 can include similar systems (e.g. multiple database nodes with a distribution layer) to database cluster 208. Database cluster 208 can be a client of destination datacenter 120. The nodes of destination datacenter 120 can be accessible over plain TCP protocols and connections. However, in some embodiments, a secured shell (SSH) tunnel can be established with a local port forwarding utilized by an XDR process. Similarly, a virtual private network (VPN) tunnel can be established between database cluster 208 and destination datacenter 120. In this case, an XDR process can use the VPN for shipping and/or other communications described herein. It is further noted that the namespace settings on both database cluster 208 and destination datacenter 120 can be identical. It is noted, that in some examples, the datacenter can have different cluster configuration like number of nodes and memory etc.

At the application layer of the database nodes 204 A-C can manage the processing of data transactions. For the sake of simplicity, not all the components of nodes 204 A-C are shown. However, it will be appreciated that nodes 204 A-C can include other components. For example, DDBMS 206 A-C can include systems as lock managers, schedulers, metadata managers, policy managers and the like. In some embodiments, nodes 204 A-C can be self-managing nodes that can reconfigure the cluster and repartition data within the cluster without a central administrative entity such as a database administrator (DBA).

Nodes 204 A-C can be linked together via internal interconnect 224. Fibre Channel protocols can use a transport protocol (similar to TCP used in IP networks) which predominantly transport small computer system interface (SCSI) commands over a Fibre Channel network. SCSI commands are typical a set of standards for physically connecting and transferring data between computers and peripheral devices. In some embodiments, TCP/IP protocols can be used to communicate between nodes.

Additionally, nodes 204 A-C can also include one or more data storage devices 214, 218 and 220 (e.g. a dynamic random-access memory (DRAM), rotating hard disk, solid-state drive (SSD), or any combination thereof) or file systems. Each data storage device 214, 218 and 220 can have a set of metadata that uniquely identifies the data it stores and the data attributes (e.g. time stamps and the like) to the DDBMS that manages the particular storage device.

An SSD device can be a data storage device that uses solid-state memory to store persistent data with the intention of providing access in the same manner of a block input/output hard disk drive. DRAM can be a type of random-access memory that stores each bit of data in a separate capacitor within an integrated circuit. The capacitor can be either charged or discharged; these two states are taken to represent the two values of a bit (0 and 1). A hard-disk drive can be a non-volatile magnetic data storage device in which data is digitally recorded by various electronic, magnetic, optical, or mechanical methods on a surface layer deposited on one or more planar, round and rotating platters.

Distribution layer 210 A-N can be implemented as one or more server cluster nodes 208 A-N. Cluster nodes 208 A-N can communicate to ensure data consistency and replication across the cluster. Distribution layer 210 A-N can use a shared-nothing architecture. The shared-nothing architecture can be linearly scalable. Distribution layer 210 A-N can perform operations to ensure database properties that lead to the consistency and reliability of the DDBMS. These properties can include atomicity, consistency, isolation, and durability.

In addition, distribution layer 210 A-N can ensure that the cluster remains fully operational when individual server nodes are removed from or added to the cluster. On each server node, a data layer 212 A-N can manage stored data on disk. Data layer 212 A-N can maintain indices corresponding to the data in the node. Furthermore, data layer 212 A-N be optimized for operational efficiency, for example, indices can be stored in a very tight format to reduce memory requirements, the system can be configured to use low level access to the physical storage media to further improve performance and the like. It is noted, that in some embodiments, no additional cluster management servers and/or proxies need be set up and maintained other than those depicted in FIG. 2.

Figure 3:
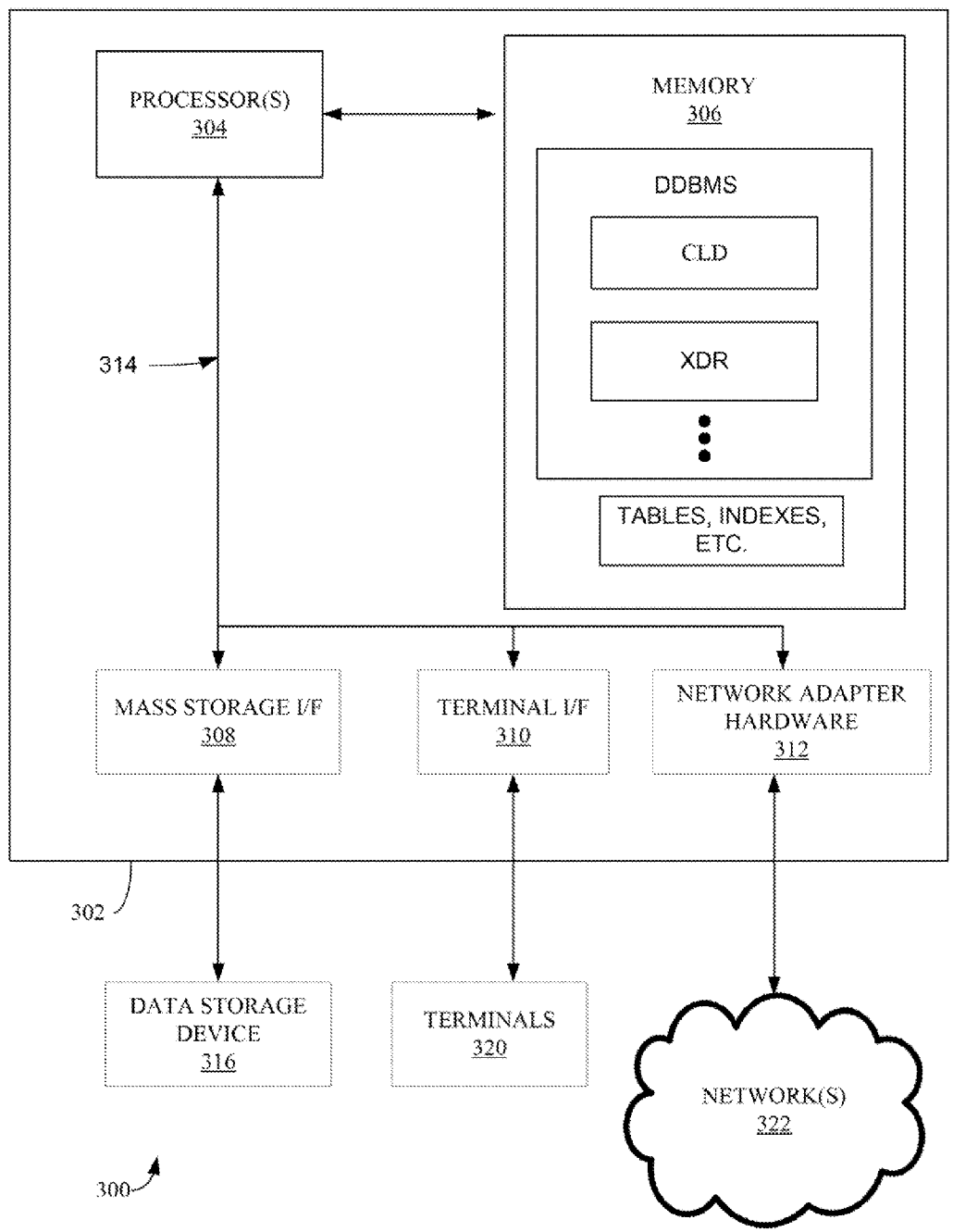
FIG. 3 depicts an exemplary computing system configured to perform any one of the processes described herein, according to an example embodiment.

FIG. 3 depicts an exemplary computing system 300 configured to perform any one of the processes described herein. in this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes, in some operational settings, computing system 300 may be configured as a system that includes one or more units, each of which is configured to carry out some aspects of the processes either in software, hardware, or some combination thereof.

FIG. 3 is a block diagram illustrating a computing system 300. The computing system 300 is based upon a suitably configured processing system adapted to implement one or more exemplary embodiments. Any suitably configured processing system can similarly be used as the computing system 300 by embodiments such as servers residing in cluster nodes, a personal computer, workstation, a distributed database server, or the like. The computing system 300 includes a computer 302. The computer 302 has a processor (s) 304 ("CPU") that is connected to a memory 306, mass storage interface 308, terminal interface 310, and network adapter hardware 312. A system bus 314 interconnects these system components. The mass storage interface 308 is used to connect mass storage devices, such as data storage device 316, to the computer 302. Examples of data storage devices 316 can include those examples discussed supra (e.g. rotating hard disk systems, SSD flash systems, DRAM, and the like), as well others such as optical drives. Data storage device 316 may be used to store data to and read data from a computer-readable medium or storage product.

Memory 306, in one embodiment, includes a distributed database management system (DDBMS) 505. In some example embodiments, memory 306 can also include one or more process and modules such as those discussed in FIG. 1-8 herein. Although illustrated as concurrently resident in the memory 306, it is clear that respective components of the memory 306 are not required to be completely resident in the memory 306 at all times or even at the same time. In one embodiment, the computer 302 utilizes conventional virtual addressing mechanisms to allow programs to behave as if they have access to a large, single storage entity, referred to herein as a computer system memory, instead of access to multiple, smaller storage entities such as the memory 306 and data storage device 316, in some embodiments, additional memory devices (such as a DRAM cache) can be coupled with computer 302 as well.

Although only one CPU 304 is illustrated for computer 302, computer systems with multiple CPUs can be used equally effectively. Some embodiments can further incorporate interfaces that each includes separate, fully programmed microprocessors that are used to off-load processing from the CPU 304. Terminal interface 310 is used to directly connect one or more terminals 320 to computer 302 to provide a user interface to the computer 302. These terminals 320, which are able to be non-intelligent or fully programmable workstations, are used to allow system administrators and users to communicate with computer 302. The terminal 320 can also include other user interface and peripheral devices that are connected to computer 302 and controlled by terminal interface hardware included in the terminal I/F 310 that includes video adapters and interfaces for keyboards, pointing devices, and the like.

An operating system (not shown) included in the memory is a suitable multitasking operating system such as the Linux, UNIX, Windows XP, and Windows Server operating system. Embodiments are able to use any other suitable operating system. Some embodiments utilize architectures, such as an object oriented framework mechanism, that allows instructions of the components of operating system to be executed on any processor located within computer 302. The network adapter hardware 312 is used to provide an interface to a network 322. Some embodiments are able to be adapted to work with any data communications connections including present day analog, and/or digital techniques or via a future networking mechanism.

Figure 4:
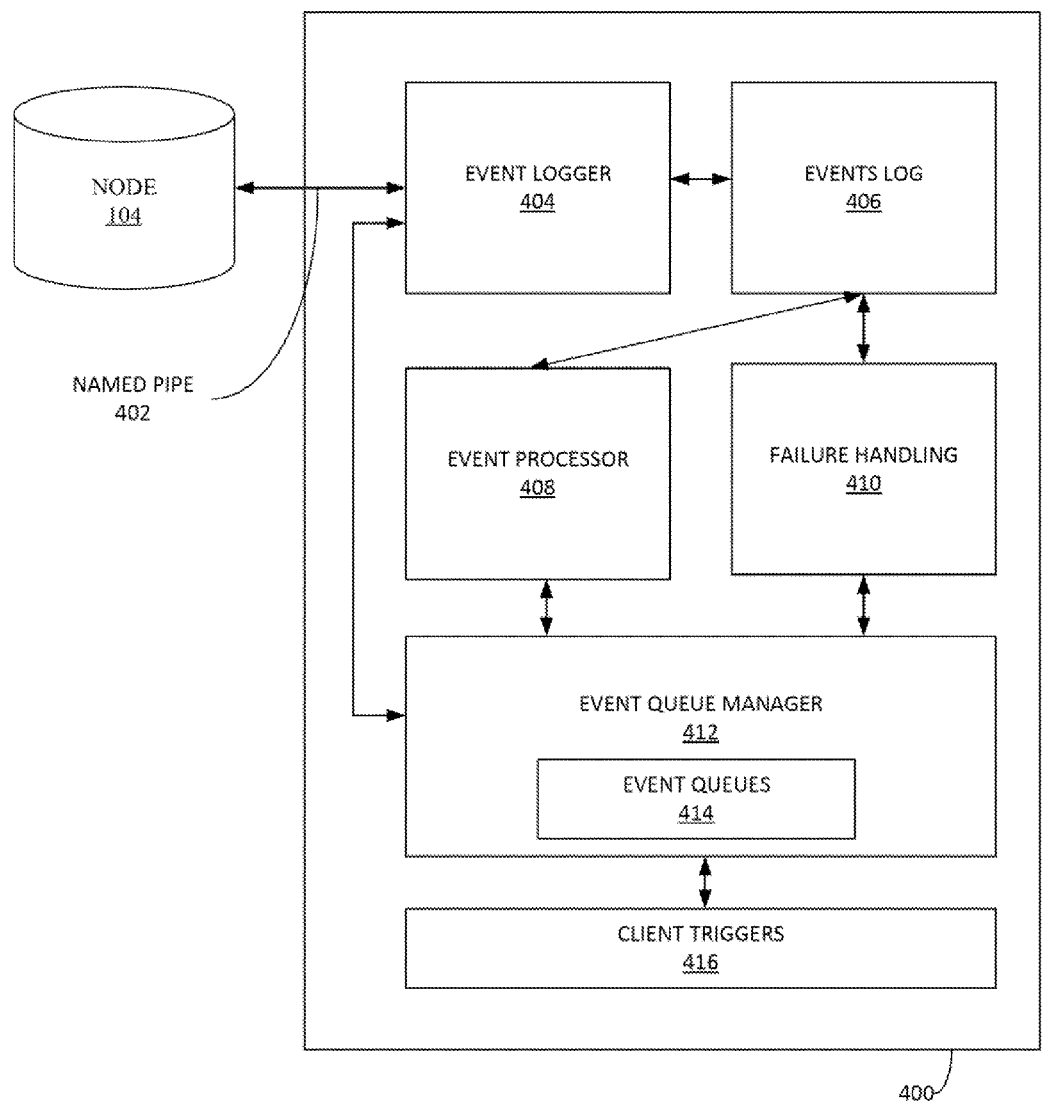
FIG. 4 depicts an example asynchronous trigger manager, according to some embodiments.

FIG. 4 depicts an example asynchronous trigger manager 400, according to some embodiments. Asynchronous trigger manager 400 can support asynchronous triggers. The triggers can be procedural code that is automatically executed in response to certain database events (e.g. read, write, scan, and/or cluster state change operations). Use cases for asynchronous triggers can include various operations such as: maintenance of secondary indexes; backup and loading; operations; aggregation on all the writes and other logical analysis; remote data center shipping; and/or 'lazy' replications to in-memory cache, Asynchronous trigger manager 400 can expose an interface (e.g. a set of functions to be implemented) to a client system. Once implemented, this interface can be hot plugged into asynchronous trigger manager 400 to enable triggers for any database event.

As shown in FIG. 4, event logger 404 can listen for communications from a datacenter server (e.g. node 104) over a named pipe 402. For example, event logger 404 can receive database event information, cluster-state modification information and/or metadata. Event logger 404 can log the received data to events logs 406 and/or queue it up directly to event queue manager 412. Event queue manager 412 can then call asynchronous trigger functions (see infra). Events logs 406 can be a pluggable persistent store that ensures the data is available in the event of the failure of node 104. In some examples, events log subsystem 406 can be a digest ring buffer. Event processor(s) 408 can manage the reading of logs from the event logs 406, Event processor (s) 408 perform required messaging and queuing to the event queue manager 412 for a trigger execution. Event queue manager 412 can manage the event and trigger information. Event queue manager 412 can also provide queue throttling/pacing mechanism and/or rogue trigger library handling mechanism, and the like. It is noted that triggers can be implemented by a client. As provided supra, a trigger can include any database-related operation such as email sending, cache coherence, as well as, 'standard' triggers such as updates into records, updates into other tables and/or secondary index maintenance, etc. In this way, client applications can implement the trigger interface. For example, client application can create a so (shared object, dynamically linked library) file and dump it in standard location and notify trigger manager 400 to hot plug it. Once notified, trigger manager 400 can map the event to the trigger.

Figure 5:
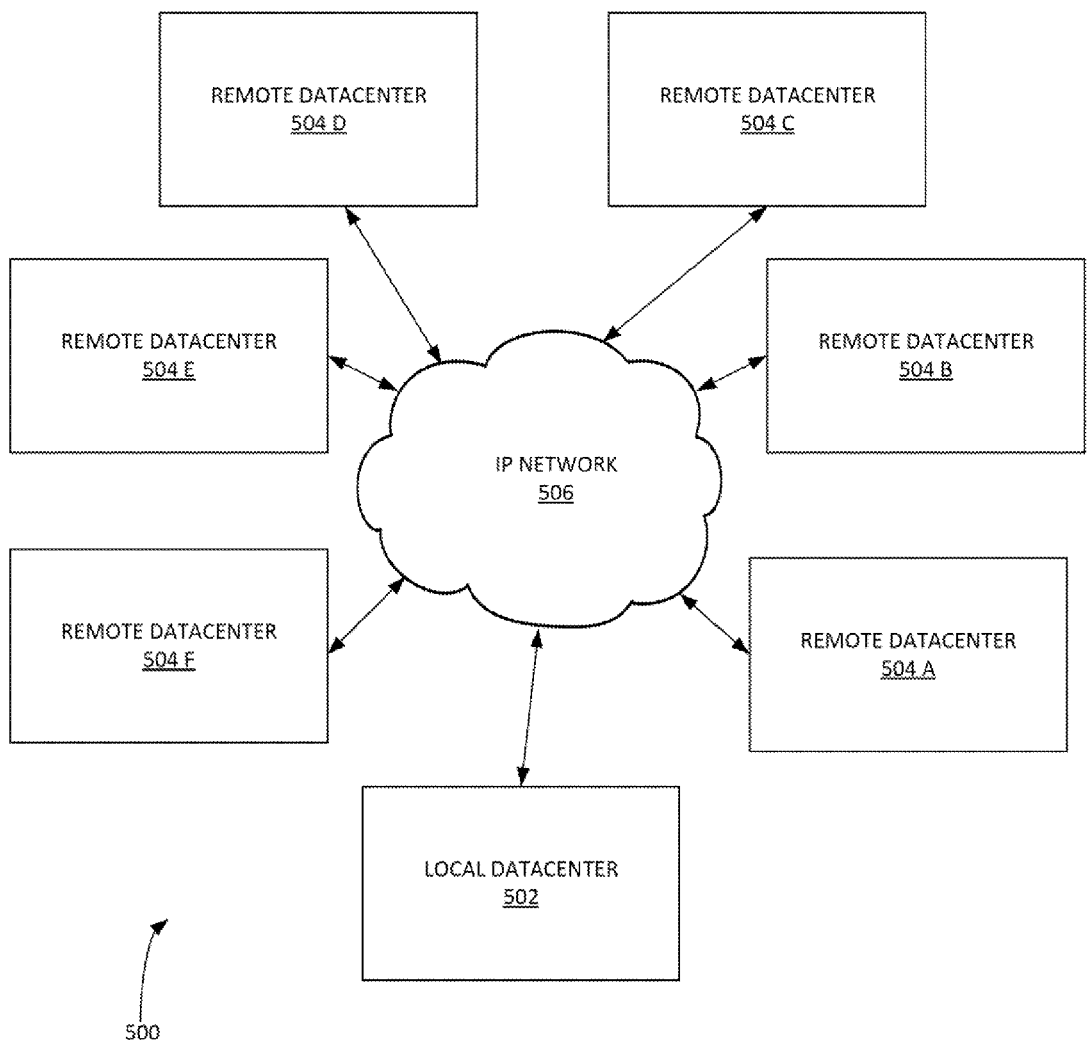
FIG. 5 illustrates an example system that includes various datacenters implemented in a star schema, according to some embodiments.

FIG. 5 illustrates an example system 500 that includes various datacenters implemented in a star schema, according to some embodiments. Local datacenter 502 can be the central node of the star schema. Remote datacenters 504 A-F can be the peripheral nodes of the star schema. In one example, local datacenter 502 can be in an active mode and remote datacenters 504 A-F can be in either active mode or passive mode. As the central node of the star schema, local datacenter 502 can receive a write operation and then ship the write to remote datacenters 504 A-F. System 500 can continue to ship write operations among its various nodes in the event a node goes offline. For example, datacenter 504 A can go offline. Local datacenter 502 can continue to send writes to remote datacenters 504 B-F. Local datacenter 502 can detect that remote datacenter 504 A is offline. When this occurs, local datacenter 502 can spawn and maintain a thread to log write operations that were shipped to remote datacenters 504 B-F for the period remote datacenter 504 A is offline. When it is later detected that remote datacenter 504 A is back online, the thread can ship the write operations in the thread to remote datacenter 504 A. In this way, write operations to remote datacenters 504 B-F are not interrupted during the period remote datacenter 504 A is offline, Furthermore, remote datacenter 504 A cart be brought to a current state once back online. Datacenters 504 A-F can communicate via IP Network 506.

FIG. 6 illustrates an example system 600 including two datacenters operating in an active-active mode, according to some embodiments. System 600 can include datacenter 604 (e.g. a local datacenter) and remote node 610 (e.g. a remote datacenter). Datacenter 604 and remote node 610 can communicate via IP network 602. Datacenter 604 and remote node 610 can include one or more CLDs and/or one or more XDRs (represented by CLDs 606 A-B and XDRs 608 A-B respectively as provided in FIG. 6). In some embodiments, in an active-active mode, the write operations can be performed at both datacenter 604 and remote node 610. For example, XDRs 608 A-B can be configured such that writes on datacenter 604 can be shipped to remote node 610 and vice versa. XDRs 608 B can ensure that the data received from datacenter 604 is not later shipped back to datacenter 604 thereby forming an infinite loop. Additionally, XDRs 608 A can ensure that the data received from remote node 610 is not later shipped back to remote node 610 as well. It is noted that communication from a source node (e.g. data center 604) to destination node (e.g. remote node 610) can be compressed.

Exemplary Processes

Figure 7:
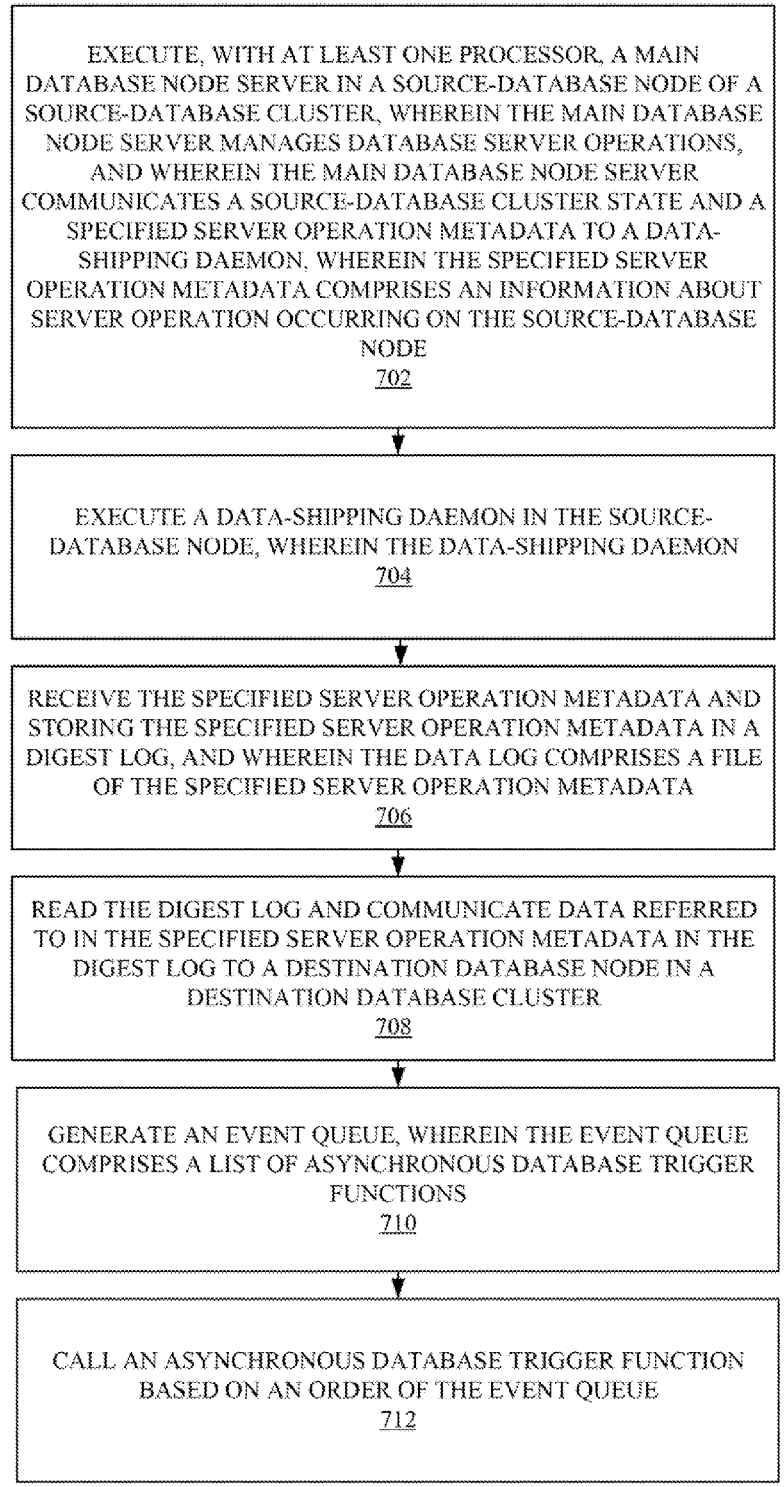
FIG. 7 depicts an example process for implementing stateless data replication between database clusters, according to some embodiments.

FIG. 7 depicts an example process 700 for implementing stateless data replication between database clusters, according to some embodiments. In step 702 of process 700, a main database node server is executed in a source-database node of a source-database cluster. The main database node server can manage various database server operations. The. main database node server can communicate a source-database cluster state and/or a specified server operation metadata to a. data-shipping daemon (e.g. XDR 108). The specified server operation metadata can include information about server operation occurring on the source-database node (e.g. various metadata about records and associated read/write operations). In step 704, a data-shipping daemon can be executed in the source-database node. The data-shipping daemon can receive the specified server operation metadata and/or store the specified server operation metadata in a digest log (e.g., data log 112). The data log can be the file that includes the specified server operation metadata. In step 706, the data-shipping daemon can read the digest log/or communicate data referred to in the specified server operation metadata in the digest log to a destination database node in a destination database cluster. In step 708, the data-shipping daemon can generate an event queue. The event queue can be a list of asynchronous database trigger functions. In step 710, the data-shipping daemon can call an asynchronous database trigger function based on an order of the event queue. Process 700 can be implemented and/or combined with various systems provided supra.

Figure 8:
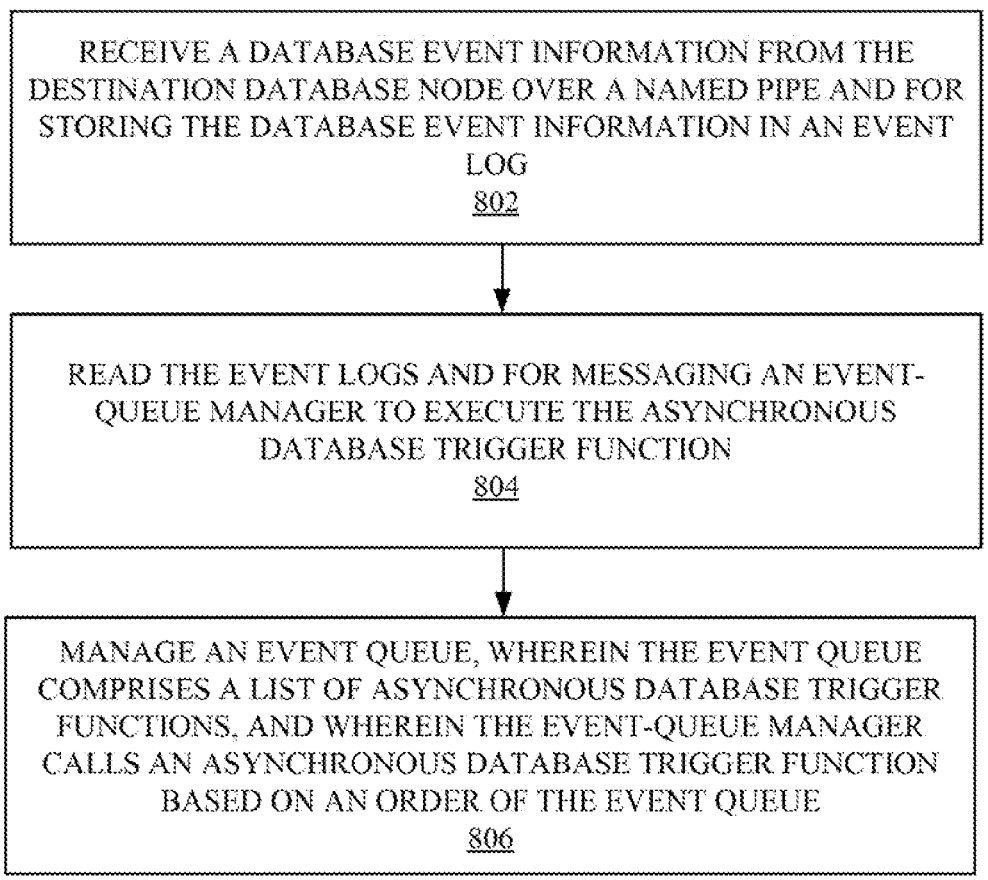
FIG. 8 depicts an example process for managing asynchronous triggers, according to some embodiments.

FIG. 8 depicts an example process 800 for managing asynchronous triggers, according to some embodiments. In step 802 of process 800, a database event information can be received from a destination database node (e.g. in a remote destination database cluster) over a named pipe (e.g. a system-persistent inter-process communication protocol). The database event information can be stored in an event log (e.g. events log 406). In step 804, the event logs can be read and a message communicate to an event-queue manager to execute the appropriate asynchronous database trigger function. In step 806, the event queue is generated and/or managed. The event queue can include a list of asynchronous database trigger functions. An event-queue manager can call an asynchronous database trigger function based on an order of the event queue. In some embodiments, various steps of process 800 can be performed by a data-shipping daemon. Process 800 can be implemented and/or combined with various systems provided supra.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized distributed database system comprising:
a main database node server executing, with at least one processor, in a source-database node of a source-database duster, wherein the main database node server manages database server operations, and wherein the main database node server communicates a source-database cluster state and a specified server operation metadata to a data-shipping daemon, wherein the specified server operation metadata comprises an information about server operation occurring, on the source-database node;
a data-shipping daemon executing in the source-database node, wherein the data-shipping daemon comprises, and wherein the data-shipping daemon further comprises:
   a failure-handling module that resumes an operation of the data-shipping daemon at a substantially current point of the digest log in the event of a recovery of the source-database node from a failed state, and that takes responsibility of shipping of data for other source-database cluster nodes which are not currently present in the source-database cluster, wherein the digest log comprises a ring-buffer,
   wherein the ring-buffer comprises a most recent specified server operation metadata, and wherein the digest logger overwrites the oldest specified server operation metadata when the ring buffer is full, and
   wherein the data-shipping daemon further comprises:
      an event logger for receiving a database event information from the destination database node over a named pipe and for storing the database event information in an event log;
      an event processor for reading the event logs and for messaging an event-queue manager to execute the asynchronous database trigger functions, and
      an event-queue manager or managing an event queue, wherein the event queue, comprises a list of asynchronous database trigger functions, and wherein the event-queue manager calls an asynchronous database trigger function based on an order of the event queue;
   a digest logger receiving the specified server operation metadata and storing the specified server operation metadata in a digest log, and wherein the data log comprises a file of the specified server operation metadata; and
   a data shipper module reading the digest log and communicate data referred to in the specified server operation metadata in the digest log to a destination database node in a destination database cluster.

2. The computerized-database system of claim 1, wherein the specified server operation metadata comprises a key digest comprising information about a write operation or an update operation and does not comprise a record of the write operation or the update operation.

3. The computerized-database system of claim 2, wherein an asynchronous database trigger comprises the destination database node operation detected by the event logger via an exposed interface in a client executing in the destination database node.

4. The computerized-database system of claim 3, wherein the event log comprises a pluggable-persistent store.

5. The computerized-database system of claim 4, wherein the event-queue manager throttles a data shipping rates based on a dynamically configurable setting.

6. The computerized-database system of claim 1,
   wherein the source-database node is in an active mode,
   wherein the destination database node and one or more other destination nodes comprise a set of peripheral nodes, and
   wherein a name of the destination database node and one or more other destination nodes is specified by a namespace section.

7. The computerized-database system of claim 6, wherein an active-active mode conflict write resolution policy comprises a monotonically-increasing number associated incremented each time a particular record is updated and wherein a higher-generation record is selected over a lower-generation record, and wherein when at least two record generations are equal then the active-active mode conflict write resolution policy further comprises selecting a later time-stamped record over an earlier time-stamped record.

8. A method comprising:
   executing, with at least one processor, a main database node server in a source-database node of a source-database cluster, wherein the main database node server manages database server operations, and wherein the main database node server communicates a source-database cluster state and a specified server operation metadata to a data-shipping daemon, wherein the specified server operation metadata comprises an information about server operation occurring on the source-database node, wherein the specified server operation metadata comprises a key digest comprising information about a write operation or an update operation and does not comprise a record associated the write operation or the update operation;
   executing a data-shipping daemon in the source-database node, wherein the data-shipping daemon, wherein the data-shipping daemon resumes operating at a substantially current point of the digest log in the event of a recovery of the source database node from a failed state, wherein the data-shipping daemon receives a database event information from the destination database node over a named pipe and stores the database event information in an event log;
   receives the specified server operation metadata and stores the specified server operation metadata in a digest log, and wherein the data log comprises a file of the specified server operation metadata, wherein the digest log comprise a ring-buffer, and wherein the ring-buffer comprises a most recent specified server operation metadata, and wherein the digest logger overwrites the oldest specified server operation metadata when the ring buffer is full;
   reads the digest log and communicate data referred to in the specified server operation metadata in the digest log to a destination database node in a destination database cluster;
   generates an event queue, wherein the event queue comprises a list of asynchronous database trigger functions; and
   calls an asynchronous database trigger function based on an order of the event queue.

9. The method of claim 8, wherein the data-shipping daemon,
   reads the event bus and messages an event-queue manager to execute the asynchronous database trigger function.

10. The method of claim 9, wherein the data-shipping daemon,
   manages the event queue, wherein the event queue comprises a list of asynchronous database trigger functions, and wherein the event-queue manager calls an asynchronous database trigger function based, on an order of the event queue.

* * * * *